US011677243B2

(12) United States Patent
Singh (10) Patent No.: US 11,677,243 B2
(45) Date of Patent: Jun. 13, 2023

(54) METHODS, DEVICES, AND SYSTEMS FOR UTILITY GRID CONTROL OF APPLIANCES BASED ON LOCATION AND IDENTITY

(71) Applicant: Telcom Ventures, LLC, Miami, FL (US)

(72) Inventor: Rajendra Singh, Indian Creek Village, FL (US)

(73) Assignee: Telecom Ventures, LLC, Miami, FL (US)

( * ) Notice: Subject to any disclaimer, the term of this patent is extended or adjusted under 35 U.S.C. 154(b) by 0 days.

(21) Appl. No.: 17/750,879

(22) Filed: May 23, 2022

(65) Prior Publication Data

US 2022/0385068 A1    Dec. 1, 2022

Related U.S. Application Data

(60) Provisional application No. 63/192,875, filed on May 25, 2021.

(51) Int. Cl.
*H02J 3/14* (2006.01)
*H04L 12/28* (2006.01)
*H02J 3/00* (2006.01)

(52) U.S. Cl.
CPC .............. *H02J 3/144* (2020.01); *H02J 3/003* (2020.01); *H04L 12/2823* (2013.01); *H04L 2012/2843* (2013.01)

(58) Field of Classification Search
CPC ....... H02J 3/144; H02J 3/003; H04L 12/2823; H04L 2012/2843
See application file for complete search history.

(56) References Cited

U.S. PATENT DOCUMENTS

| 9,411,780 B1 | 8/2016 | Awad et al. | |
| 2007/0043478 A1* | 2/2007 | Ehlers | F24F 11/30 700/276 |
| 2008/0319893 A1* | 12/2008 | Mashinsky | G05B 15/02 705/37 |
| 2010/0138363 A1 | 6/2010 | Batterberry et al. | |
| 2010/0289643 A1* | 11/2010 | Trundle | G05B 15/02 340/3.1 |

(Continued)

FOREIGN PATENT DOCUMENTS

| EP | 3570498 A1 * | 11/2019 | ......... H04L 12/2823 |
| WO | 2020056133 A1 | 3/2020 | |

OTHER PUBLICATIONS

"International Search Report and Written Opinion of the International Searching Authority", International Application No. PCT/US22/30509, dated Aug. 17, 2022, 24 pp.

*Primary Examiner* — Christopher E. Everett
(74) *Attorney, Agent, or Firm* — Myers Bigel, P.A.

(57) ABSTRACT

A method for operating an appliance on a power grid operated by a utility is described. The method includes receiving, at a server associated with the utility, information indicating whether a person is present in a proximity of the appliance, determining, by the server, an operational state of the appliance based on whether the person is present in the proximity of the appliance, and transmitting to the appliance, via a communication link associated with the power grid, control information related to the operational state to control operation of the appliance. Related methods, devices and systems are described.

28 Claims, 7 Drawing Sheets

(56) References Cited

U.S. PATENT DOCUMENTS

| | | | |
|---|---|---|---|
| 2010/0289644 A1* | 11/2010 | Slavin | G08B 13/2462 |
| | | | 340/568.1 |
| 2012/0065796 A1* | 3/2012 | Brian | G05B 15/02 |
| | | | 700/295 |
| 2012/0217805 A1 | 8/2012 | De Chabris | |
| 2013/0305337 A1 | 11/2013 | Newman et al. | |
| 2014/0039691 A1* | 2/2014 | Gupta | G05D 23/1932 |
| | | | 700/278 |
| 2014/0207292 A1* | 7/2014 | Ramagem | G05D 23/1902 |
| | | | 700/278 |
| 2014/0222241 A1* | 8/2014 | Ols | F24F 11/70 |
| | | | 700/299 |
| 2015/0309483 A1* | 10/2015 | Lyman | H04L 12/2829 |
| | | | 700/275 |
| 2016/0066393 A1 | 3/2016 | Bosua | |
| 2016/0259308 A1* | 9/2016 | Fadell | H04L 12/2823 |
| 2018/0153012 A1 | 5/2018 | Lee et al. | |
| 2018/0207393 A1 | 7/2018 | Baek et al. | |
| 2019/0208020 A1* | 7/2019 | Um | H04L 67/125 |
| 2020/0285206 A1* | 9/2020 | Young | G08B 19/00 |

* cited by examiner

METHODS, DEVICES, AND SYSTEMS FOR UTILITY GRID CONTROL OF APPLIANCES BASED ON LOCATION AND IDENTITY

CROSS-REFERENCE TO RELATED APPLICATION

The present application claims the benefit of U.S. Provisional Patent Application Ser. No. 63/192,875, filed May 25, 2021, the disclosure of which is herein incorporated in its entirety by reference.

BACKGROUND

Various embodiments described herein relate to methods, devices, and systems for utilities, and more particularly to controlling appliances on a utility grid operated by a utility.

Appliances in the home or office increasingly have network connectivity. The network connectivity is being used to allow control of appliances or devices from remote locations. Network connectivity may further be leveraged to improve access, location-based services, and security of operating appliances.

SUMMARY

Various embodiments of the present invention are directed to a method of operating an appliance on a power grid operated by a utility. The method includes receiving, at a server associated with the utility, information indicating whether a person is present in a proximity of the appliance, determining, by the server, an operational state of the appliance based on whether the person is present in the proximity of the appliance, and transmitting to the appliance, via a communication link associated with the power grid, control information related to the operational state to control operation of the appliance.

According to some embodiments, the method may include determining, by the server, whether the person is a restricted person, responsive to determining that the person is present in the proximity of the appliance, and setting the operational state of the appliance to a restricted state when the person is the restricted person. The method may include detecting that the restricted person has left the proximity of the appliance, setting the operational state of the appliance to an unrestricted state, responsive to detecting that the restricted person has left the proximity, and transmitting, via the communication link, control information indicating the unrestricted state to the appliance. The operational state of the appliance includes enabling the appliance, disabling the appliance, controlling characteristics of the appliance, and/or controlling power from the power grid to the appliance.

According to some embodiments, the method may include receiving, by the server, biometric information associated with the person, responsive to determining that the person is present in the proximity of the appliance. The operational state of the appliance may be determined based on the biometric information. The biometric information may include sleep information of the person. The operational state indicates activating the appliance based on the sleep information of the person indicating the person is awake. The operational state indicates deactivating the appliance based on the sleep information of the person indicating the person is asleep. The sleep information of the person may include a sleep pattern. The operational state indicates an operational pattern for operation of the appliance based on the sleep pattern.

According to some embodiments, the method may include receiving, by the server, health information associated with the person, responsive to determining that the person is present in the proximity of the appliance. The operational state of the appliance is determined based on the health information. The method may include transmitting, to the appliance, a notification of energy demands, responsive to determining that the person is present in the proximity of the appliance, and receiving a selection responsive to the notification of energy demands. The control information related to the operational state of the appliance is based on the selection that was received.

According to some embodiments, the person may be a first person. The method may include receiving, by the server, information indicating whether a second person is present in the proximity of the appliance, receiving, by the server, first personal preferences of the first person and second personal preferences of the second person, aggregating the first personal preferences and the second personal preferences to determine aggregated conditions, and determining the control information related to the operational state of the appliance based on the aggregated conditions.

Various embodiments of the present invention are directed to a method of operating an appliance on a power grid operated by a utility. The method includes transmitting, to a server associated with the utility, information indicating whether a person is present in a proximity of the appliance, receiving, via a communication link associated with the power grid, control information that includes an operational state to control operation of the appliance, responsive to the person being in the proximity of the appliance, and operating the appliance based on the operational state that was received. The operational state that was received indicates that the person that is present in the proximity of the appliance is a restricted person. The method may include deactivating the appliance responsive to the operational state indicating the restricted person. In some embodiments, the method may include detecting that the restricted person has left the proximity of the appliance, and activating the appliance responsive to detecting that the restricted person has left the proximity of the appliance. The operational state of the appliance includes enabling the appliance, disabling the appliance, controlling characteristics of the appliance, and/or controlling power from the power grid to the appliance.

According to some embodiments, the method may include transmitting biometric information associated with the person to the server, when the person is present in the proximity of the appliance. The operational state that was received from the server is based on the biometric information that was transmitted. The method may include, prior to transmitting the biometric information, receiving the biometric information from a wireless electronic device in the proximity of the appliance. The wireless electronic device is associated with the person. The biometric information may include sleep information of the person. The operational state indicates activating the appliance based on the sleep information of the person indicating the person is awake. The operational state indicates deactivating the appliance based on the sleep information of the person indicating the person is asleep. The sleep information of the person may include a sleep pattern. The operational state may indicate an operational pattern for operation of the appliance based on the sleep pattern. The operational state of the appliance may be based on health information associated with the person.

According to some embodiments, the method may include receiving, by the appliance, a notification of energy demands, when the person is present in the proximity of the appliance, and transmitting, by the appliance, a selection responsive to the notification of energy demands. The operational state of the appliance that was received is based on the selection that was transmitted.

According to some embodiments, the person is a first person. The method may include transmitting, to the server, information indicating that a second person is present in the proximity of the appliance, and transmitting first personal preferences of the first person and second personal preferences of the second person to the server. The operational state that is received may include aggregated conditions based on the first personal preferences and the second personal preferences.

Various embodiments described herein can provide a computer program product for operating an appliance on a power grid operated by a utility including a non-transitory computer readable storage medium that includes computer readable program code therein that when executed by a processor causes the processor to perform operations including transmitting, to a server associated with the utility, information indicating whether a person is present in a proximity of the appliance, receiving, via a communication link associated with the power grid, control information including an operational state to control operation of the appliance, responsive to the person being in the proximity of the appliance, and operating the appliance based on the operational state that was received.

Various embodiments described herein can provide an appliance on a power grid operated by a utility. The appliance includes a transmitter configured to transmit to a server associated with the utility, information indicating whether a person is present in a proximity of the appliance, a receiver configure to receive, via a communication link associated with the power grid, control information that includes an operational state to control operation of the appliance, responsive to the person being in the proximity of the appliance, and a processor configured to operate the appliance based on the operational state that was received.

It is noted that aspects of the inventive concepts described with respect to one embodiment, may be incorporated in a different embodiment although not specifically described relative thereto. That is, all embodiments and/or features of any embodiment can be combined in any way and/or combination. Other operations according to any of the embodiments described herein may also be performed. These and other aspects of the inventive concepts are described in detail in the specification set forth below.

DETAILED DESCRIPTION

Various embodiments will be described more fully hereinafter with reference to the accompanying drawings. Other embodiments may take many different forms and should not be construed as limited to the embodiments set forth herein. Like numbers refer to like elements throughout.

Location-based services may be used to provide user-specific services that are relevant to a person at a particular location. Various embodiments described herein arise from the recognition that smart appliances and systems that control these smart appliances may use information about a person being in the vicinity or proximity of the appliance to control operating conditions of the appliance. Specifically, detection of one or more persons in the proximity of an appliance may be used by a utility to control the appliance appropriately. As used herein, a "person" may be a human being or a non-human entity such as a robot, machine, device or apparatus. A non-human entity may enable a machine helping a machine, device, or appliance perform operations.

Various embodiments relate to providing control of appliances in the home, in a commercial environment, or in other buildings based on location and/or identity of an associated user. Specifically, intelligent machines can control power and/or access to appliances from a utility grid based on a location and/or identity of a user. For example, an appliance such as a washer or dryer cannot finish a task by itself, but is reliant on a user being available to move clothes into or out of the washer or dryer. The washer or dryer thus may be operated when the person is detected in the vicinity and the person may be provided notifications regarding the washer or dryer when the person is in the vicinity. A utility or other entity may control operation of the appliance and use location-based authentication of a user to determine if the user is in the proximity or location of the appliance and selectively turn on the appliance or allow the appliance to be operated. The person's presence near an appliance may be determined using a variety of sensors or technologies such as Near Field Communication (NFC), GPS, BLUETOOTH®, motion detectors, thermal sensors, or the like.

The power grid is a power network that provides electric power to a home, business, or other buildings. The power grid may extend into the building to supply power and/or provide network connectivity to various appliances in the building. The power grid may be controlled by an electric utility that generates and/or distributes power across the power grid. In addition to power lines, the power grid may include communication links from one or more servers associated with the electric utility or other entity to various appliances that are connected to the power grid. The servers may be able to communicate with the various appliances in the building. The servers may use the utility grid to provide power, block power distribution, enable operation, disable operation, and/or allow limited operation of an appliance connected to the utility grid.

In some embodiments, a utility company such as an electric utility may inform the user that there is excess energy available and provide a discount if the appliances are operated in a time window of excess energy capacity. In other words, the utility company may provide a customer with information regarding when it would be cost-wise beneficial to run particular appliances. For example, a user may dynamically get a notification when the user is home and/or in the proximity of the appliance regarding when utility usage is low and/or prices are lower to run high energy usage appliances like a clothes dryer or an electric vehicle charging station. This results in better utilization of energy production and resources of a utility company. Coupling the excess energy availability by a utility company to location-based authentication of users improves energy utilization and reduces demands on the power grid. Other ways to reduce demands on the power grid may include selectively enabling or disabling operation of various appliances in the house or building based on the presence of a person and/or current energy demands.

The server associated with the utility may control the temperature, humidity, or other climate parameters in the house based on personal preferences of two or more persons in the house. The server may be located at the utility, may be in the cloud, and/or may be at the house or building. Wireless electronic devices associated with the two or more persons may gather and provide personal preferences regarding the climate of the house or building to the server. In some embodiments, the server may receive the preferences of the individuals at a time of account setup or when the person is associated with the building. At a given time, the server may aggregate the preferences, such as the temperature or humidity preferences of the persons that are in the building at the given time. Aggregating the preferences may include averaging each of the preferred conditions of the persons that are detected to be in the location associated with the climate control system. In some cases, the preferences of particular individuals such as parents or elderly persons may be weighted higher than the preferences of children or younger individuals during aggregation of the preferences. Using presence detection, the climate inside the house or building may be adjusted based on the preferences of those that are currently present in the house or building.

According to some embodiments, upon detecting the presence of particular individuals, the utility company and/or server may disable operation of specific appliances that should not be operated by these individuals. For example, children who come home from school and/or are home by themselves should not operate certain appliances such as stoves. Adults with health situations may also be prevented from operating certain appliances such as stoves or may need to have the temperature range of the thermostat locked into a particular range. Individuals with health issues or age restriction for appliance operation may be referred to herein as a "restricted individual" or a "restricted person". A server may receive a notification of the presence of a restricted individual at the home or building. The server may communicate across a communication link to the various appliances in the home or building and selectively enable or disable operation of the appliances, based on the presence of these restricted individuals. The communication link may be associated with the power grid. In some embodiments, if a restricted individual is not home, then the operation of the appliances may be selectively enabled or selectively disabled. For example, when a person is not home, a rechargeable device may stop charging or lights may be powered off.

According to some embodiments, when a person is in the proximity of an appliance, a wireless electronic device associated with the person, such as a mobile phone, may transmit personal information about the person to a server over a communication link. This personal information may include appliance operation restrictions, health information, biometric information, and/or health monitoring information. In some embodiments, the personal information such as health information and restrictions may be obtained by the server from a database.

For example, health information may indicate that a person has a medical condition such as the dermatological condition known as eczema. The server may control an appliance such as a climate control system, an HVAC system, or a humidifier in the house when the person with eczema is home such that a proper humidity level and/or temperature are maintained in order to improve the person's eczema.

According to some embodiments, biometric information of the user may be used to control appliances. For example, the body temperature, heart rate, and sleep cycles may be used to control appliances such as the HVAC system, humidifier, heat-generating appliances such as stoves or dryers, and/or ceiling fans. For example, a biometric sensor may be worn by or associated with a person in the house that has one or more appliances. A wireless electronic device such as a mobile phone may transmit the biometric information collected by the biometric sensor to an appliance that is connected to an electric utility by a power grid over a communication link. In some embodiments, the wireless electronic device may directly communicate with a server. A server may use the received biometric information to determine if the temperature and/or humidity in the house needs to be lowered. For example, if the person's body temperature and/or heart rate are above respective thresholds, then the server may communicate with the HVAC system to lower the temperature, may turn on one or more ceiling fans in the proximity of the person, and/or disable operation of heat-generating appliances such as stoves or dryers.

According to some embodiments, multiple appliances may be operated in conjunction with one another based on the presence of a person in a particular location or within proximity of an appliance. Proximity of the person to the appliance and/or a location within a threshold distance from the appliance may be considered in operating two or more appliances. For example, a climate control system or HVAC system may be activated if the person is in the house. The house may be divided into several locations, such as various rooms or zones. The locations may be a subset of the proximity covered by the HVAC system. In other words, a person may be in the proximity of an appliance, such as the controller of the HVAC system, and may also be in a location or zone that corresponds to one room out of a plurality of rooms within the proximity of the HVAC system. If the person's presence is identified as being in a particular room, the temperature, humidity, air flow, and/or other conditions may be determined and sent to the server. The particular room in which the person is present may include a second appliance such as a fan or humidifier. Based on the room conditions, the server may send control information to the second appliance. Control information sent to the second appliance from the server may cause the second appliance to enable, disable, or control the settings such as fan speed or humidity level of the second appliance.

According to some embodiments, biometric information may include sleep patterns and/or sleep cycles. The sleep times, sleep patterns, and or wake-up times may be transmitted to the server. The times of operation of one or more appliances may also be sent to the server. The server may determine a correlation between when someone wakes up and when they use various appliances such as a hot water heater, shower, lights, music system, etc. Based on the biometric information, the server may control various appliances to warm water at the needed times, turn on/off lights, dishwasher, music, security system, etc. The server may find a pattern in the person's behavior and then base operation of various appliances based on the pattern. In some embodiments, real-time data, such as when a person wakes up, may trigger the operation of appliances by the server. In other words, in addition to the presence of the person in the proximity of the appliance, the awake or sleeping state of the person may be considered in controlling operation of various appliances.

Controlling an appliance by a server may include the utility cycling power on a portion of the power grid that is electrically connected to the appliance. Controlling the appliance may include selectively enabling or disabling power to a circuit breaker that is connected to the appliance. Controlling the appliance by a utility may include transmitting control information to an appliance from the utility over a communication link to the appliance.

Figure 1:
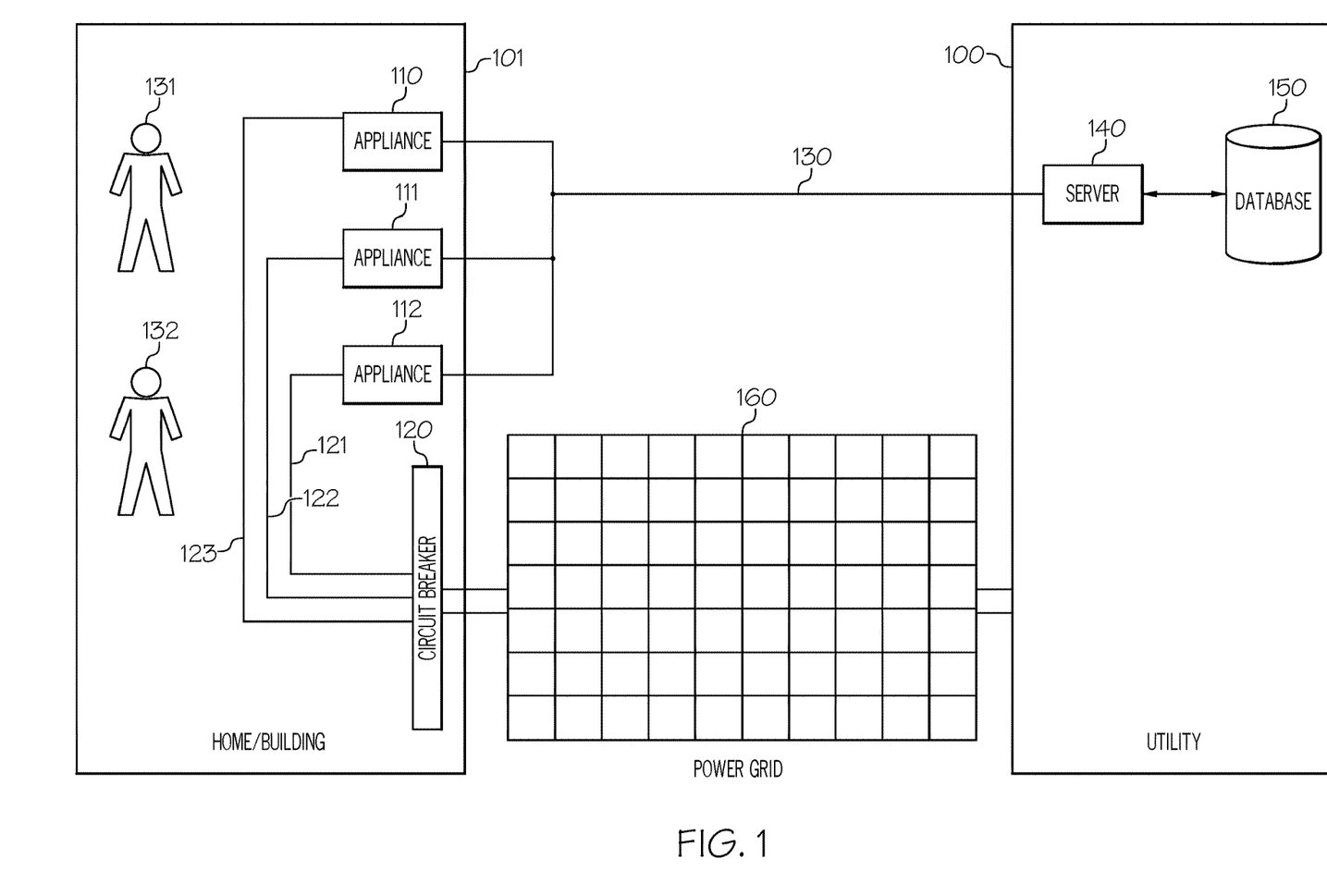
FIG. 1 illustrates a schematic diagram of appliances on a power grid operated by a utility, according to various embodiments described herein.

FIG. 1 illustrates a schematic diagram of appliances on a power grid operated by a utility, according to various embodiments described herein. Referring to FIG. 1, a utility 100 such as an electric utility, may provide power over a power grid 160 to a home, office, or other building 101. The building 101 may include appliances 110, 111, 112 that are powered from the power grid 160. A circuit breaker 120 or other power regulating device may be connected to power grid 160 and provide power via power lines 121, 122, 123 to appliances 110, 111, 112. The circuit breaker 120 may selectively control operation of individual ones of appliances 110, 111, 112. The appliances 110, 111, 112 may be in communication with the utility 100 through a communication link 130. Communication link 130 may be logically associated with power grid 160 such that control of the appliances 110, 111, and 112 may be performed based on instructions transmitted to appliances 110, 111, and 112 on communication link 130 and/or controlling power from power grid 160 to appliances 110, 111, and 112. The appliances 110, 111, 112 may communicate with the server 140 that is associated with utility 100 through the communication link 130. The server 140 may be co-located with the utility 100 or may be separate from utility 100 but logically in connection and/or communication with the utility 100. Server 140 may communicate with a database 150 or other memory or storage device that stores information related to appliances 110, 111, 112 and/or one or more persons 131, 132 that are associated with building 101.

Figure 2:
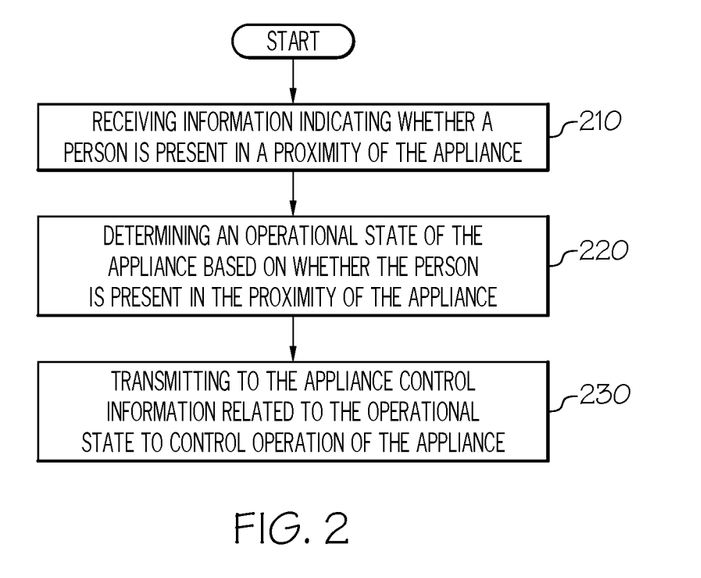
FIGS. 2 to 15 are flowcharts of operations for operating an appliance on a power grid operated by a utility, according to various embodiments described herein.

FIG. 2 is a flowchart of operations for operating an appliance on a power grid operated by a utility, according to various embodiments described herein. Referring to FIG. 2, information indicating whether a person is present in a proximity of the appliance may be received at a server associated with the utility or other entity, at block 210. Proximity of the person to the appliance may be based on a threshold distance from the appliance or based on a location-based determination such as GPS, near field communication (NFC), BLUETOOTH® etc. The proximity may be a distance within 10 meters of the appliance. An operational state of the appliance may be determined by the server based on whether the person is present in the proximity of the appliance, at block 220. The operational state of the appliance may be determined by the server based on information received from the appliance regarding the proximity of a person to the appliance and/or based on other conditions determined or received by the server. Control information related to the operational state to control operation of the appliance may be transmitted to the appliance via a communication link associated with the power grid, at block 230. The communication link may be a wired or wireless link that connects the server that with the appliance. The communication link may be used by a server associated with the utility and/or power grid to communicate with the appliance regarding controlling the power from and/or access to the power grid by the appliance.

Figure 3:
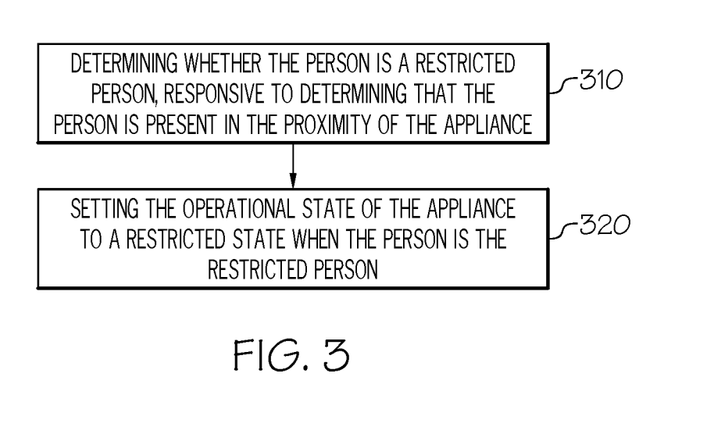

FIG. 3 is a flowchart of operations for operating an appliance on a power grid operated by a utility. Referring to FIG. 3, whether the person is a restricted person is determined by the server, responsive to determining that the person is present in the proximity of the appliance, at block 310. The operational state of the appliance is set to a restricted state when the person is the restricted person, at block 320. When a restricted person such as a child or elderly person enters the proximity of the appliance, a notification may be sent from the appliance to the server. Based on this notification, the server may determine that the appliance should not be operated by the restricted person and may set the operational state for the appliance accordingly.

Figure 4:
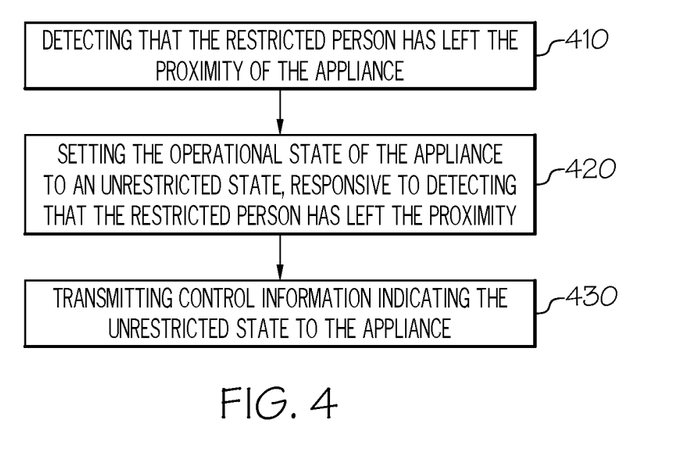

FIG. 4 is a flowchart of operations for operating an appliance on a power grid operated by a utility. Referring to FIG. 4, the server may detect that the restricted person has left the proximity of the appliance, at block 410. The detection by the server may be based on a notification sent from the appliance that the restricted person has left the proximity of the appliance. The appliance may detect this change in the restricted person's proximity or a wireless electronic device associated with the person may detect that the restricted person has left the proximity of the appliance. In some embodiments, the wireless electronic device such as a mobile device may detect and inform the server. In some embodiments, the wireless electronic device may detect the change in the restricted person's proximity to the appliance and inform the appliance such that the appliance may communicate this information to the server over the communication link. The communication link may be associated with the power grid. The operational state of the appliance may be set to an unrestricted state, responsive to detecting that the restricted person has left the proximity of the appliance, at block 420.

Still referring to FIG. 4, control information indicating the unrestricted state may be transmitted via the communication link to the appliance, at block 430. The operational states of the appliance may include enabling the appliance, disabling the appliance, controlling characteristics or parameters of the appliance, and/or controlling power from the power grid to the appliance. Power to the appliance may be controlled at a circuit breaker that is between the power grid and the appliance.

Figure 5:
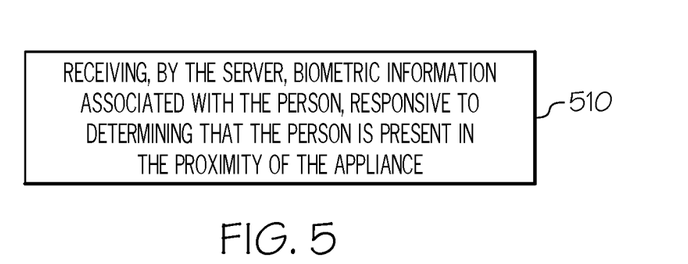

FIG. 5 is a flowchart of operations for operating an appliance on a power grid operated by a utility. Referring to FIG. 5, biometric information associated with the person may be received by the server, responsive to determining that the person is present in the proximity of the appliance, at block 510. The operational state of the appliance may be determined based on the biometric information.

The biometric information may include sleep information of the person. The sleep information may include times that the person is awake or asleep, times when the person is restless, and/or average timings of sleeping. The operational state may indicate that the appliance should be activated based on the sleep information indicating that the person is awake. The operational state may indicate that the appliance should be deactivated based on the sleep information indicating the person is asleep. In some embodiments, some appliances such as a dishwasher or electric vehicle may be operated or charged when the person is asleep.

The sleep information of the person may include a sleep pattern that comprises sleep data collected over time. The operational state received by the appliance may indicate an operational pattern for operation of the appliance based on the sleep pattern.

Figure 6:
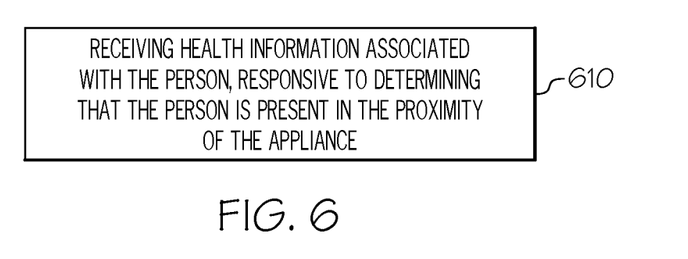

FIG. 6 is a flowchart of operations for operating an appliance on a power grid operated by a utility. Referring to FIG. 6, health information associated with the person may be received by the server responsive to determining that the person is present in the proximity of the appliance, at block 610. The operational state of the appliance may be determined based on the health information. The health information may include instantaneous health information about the person including medical events such as a heart attack or stroke during which appliances may need to be activated or deactivated. Some health information such as underlying health conditions of a person may be stored in a database.

Some medical conditions such as reduced mental capacities, eczema, and/or age restrictions may affect the operational state of the appliance when the person is in proximity to the appliance. For example, a person with reduced mental capacities may not be allowed to operate an appliance such as a stove. The operational state of the appliance may be deactivated when a person with reduced mental capacity is in the proximity of the appliance. Similarly, a very young person or a very elderly person that is in the proximity of the appliance may trigger changing the operational state to be deactivated.

Figure 7:
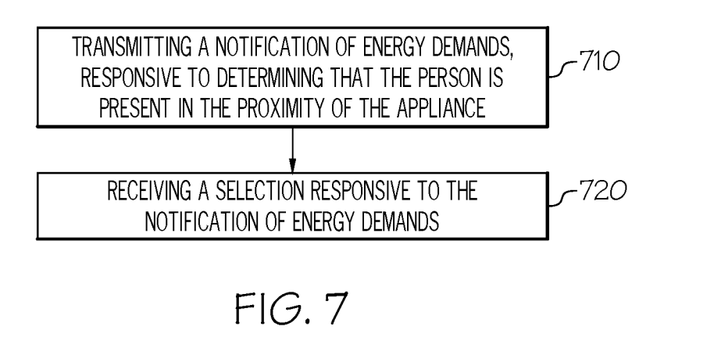

FIG. 7 is a flowchart of operations for operating an appliance on a power grid operated by a utility. Referring to FIG. 7, a notification of energy demands may be transmitted to the appliance, responsive to determining that the person is present in the proximity of the appliance, at block 710. A selection may be automatically generated by the appliance based on various conditions such as the presence of a person in the proximity of the appliance. In some embodiments, the person may enter their selection directly on the appliance or may enter their selection on a wireless electronic device such as a mobile device that is in communication with the appliance and/or in communication with the server. The server receives the selection that is responsive to the notification of energy demands, at block 720. The control information related to the operational state of the appliance that is set by the server is based on the selection that was received by the server.

According to some embodiments, energy demands and/or transfer of energy may be done on a sector-by-sector basis. An energy sector may include a home or building, a group of homes or buildings, floors within a home or building, or rooms in the home or building. Various energy sectors may be in different geographical areas. Each energy sector may be connected to an energy grid or a portion of an energy grid (i.e., sub-grid). Energy may flow from one energy sub-grid to another as energy demands dynamically change. Decisions to transfer energy from one sub-grid to another may be based on the presence of a person in the geographical area.

A real time market-place for energy may be created with decisions to transfer energy to and/or receive energy from an energy sub-grid being based on the presence of the person in the geographical area. For example, a server may receive information that various appliances in a geographical area require energy for operation when a person enters the a given geographical area, such as a when a person comes home. The server may determine which of the energy sub-grids associated with other geographical areas have excess power and/or pricing. The server may decide which energy sub-grid may supply energy to the given sub-grid and provide commands to the various sub-grids to reroute power. In some embodiments, the server may provide information regarding energy availability and/or pricing to the person in the given geographical area such that the person may provide a decision to the server as to which sub-grid to use. When different competing homes or buildings in the same or different geographical areas compete for energy, an auction of the excess energy from other sub-grids may take place where persons that are present in the geographical location that need energy from different sub-grids bid on energy costs. The server may determine the amount of energy, price, and/or the source sub-grid from which a given person receives the energy that they need based on the auction process. Similarly, excess energy from homes or buildings in a geographical area may be sold back to an energy utility by having an auction based on the excess energy available at various energy sub-grids.

Figure 8:
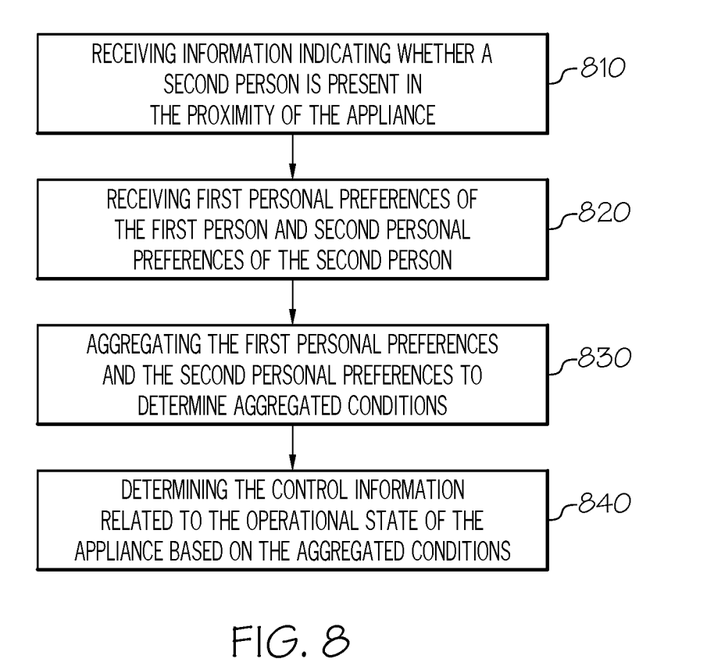

FIG. 8 is a flowchart of operations for operating an appliance on a power grid operated by a utility. In some embodiments more than one person may be in the proximity of the appliance. As an example, a first person and a second person may be in proximity of the appliance. Referring to FIG. 8, in addition to proximity information about a first person, information indicating whether a second person is present in the proximity of the appliance may be received by the server, at block 810. First personal preferences of the first person and second personal preferences of the second person may be received by the server, at block 820. The first personal preferences and the second personal preferences may be aggregated to determine aggregated conditions, at block 830. Aggregated conditions may include averaging, weighted averaging, selective consideration of a particular person's preferences based on factors such as age, health, etc., and/or mathematical or qualitative consideration of the preferences of people in the proximity of the appliance. The control information related to the operational state of the appliance may be determined based on the aggregated conditions, at block 840.

Figure 9:
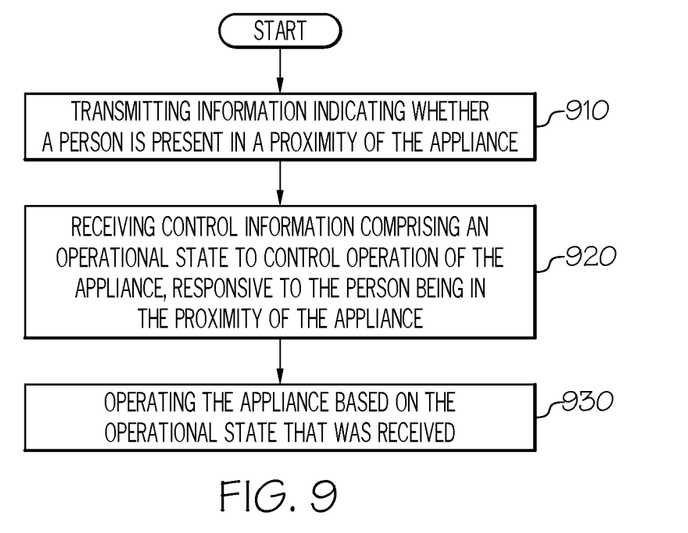

FIG. 9 is a flowchart of operations for operating an appliance on a power grid operated by a utility. Referring to FIG. 9, information indicating whether a person is present in a proximity of the appliance may be transmitted to a server associated with the utility, at block 910. Control information including an operational state to control operation of the appliance may be received via a communication link associated with the power grid, responsive to the person being in the proximity of the appliance, at block 920. The appliance may be operated based on the operational state that was received, at block 930.

Figure 10:
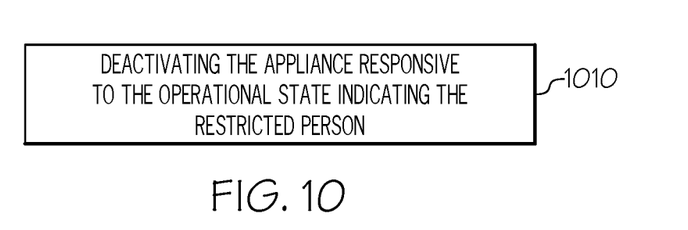

FIG. 10 is a flowchart of operations for operating an appliance on a power grid operated by a utility. The operational state that was received indicates that the person that is present in the proximity of the appliance is a restricted person. Referring to FIG. 10, the appliance may be deactivated responsive to the operational state indicating the restricted person, at block 1010.

Figure 11:
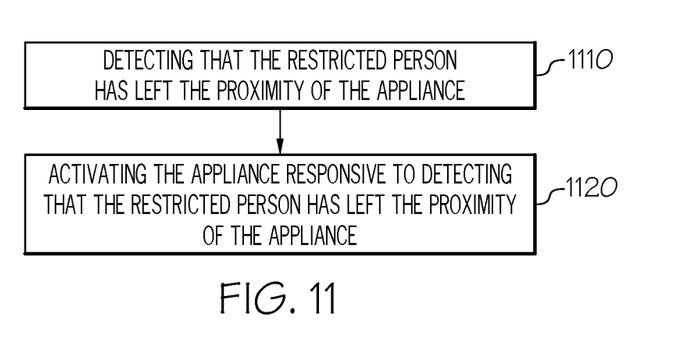

FIG. 11 is a flowchart of operations for operating an appliance on a power grid operated by a utility. Referring to FIG. 11, the server may detect that the restricted person has left the proximity of the appliance, at block 1110. The appliance may be activated responsive to detecting that the restricted person has left the proximity of the appliance, at block 1120. In some embodiments, the operational state of the appliance may include enabling the appliance, disabling the appliance, controlling characteristics of the appliance, and/or controlling power from the power grid to the appliance, based on the proximity of the restricted person to the appliance.

Figure 12:
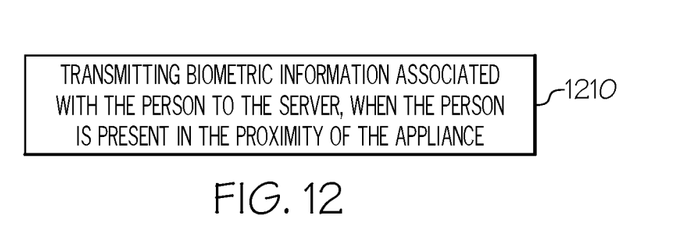

FIG. 12 is a flowchart of operations for operating an appliance on a power grid operated by a utility. Referring to FIG. 12, biometric information associated with the person may be transmitted to the server when the person is present in the proximity of the appliance, at block 1210. The operational state that was received may be based on the biometric information that was transmitted.

Figure 13:
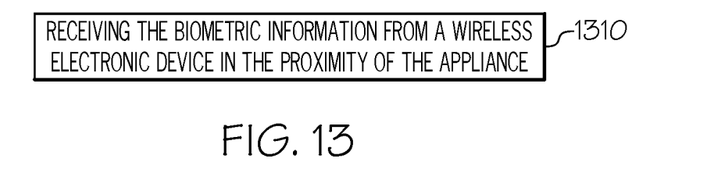

FIG. 13 is a flowchart of operations for operating an appliance on a power grid operated by a utility. Referring to FIG. 13, prior to transmitting the biometric information, the biometric information may be received from a wireless electronic device that is in the proximity of the appliance, at block 1310. The wireless electronic device may be, for example, a mobile phone that is associated with the person.

Figure 14:
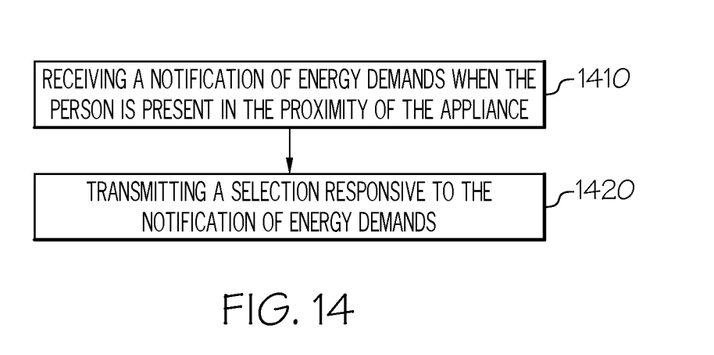

FIG. 14 is a flowchart of operations for operating an appliance on a power grid operated by a utility. Referring to FIG. 14, a notification of energy demands may be received by the appliance when the person is present in the proximity of the appliance, at block 1410. A selection responsive to the notification of energy demands may be transmitted by the appliance, at block 1420. The operational state of the appliance that was received from the server may be based on the selection that was transmitted from the appliance to the server.

Figure 15:
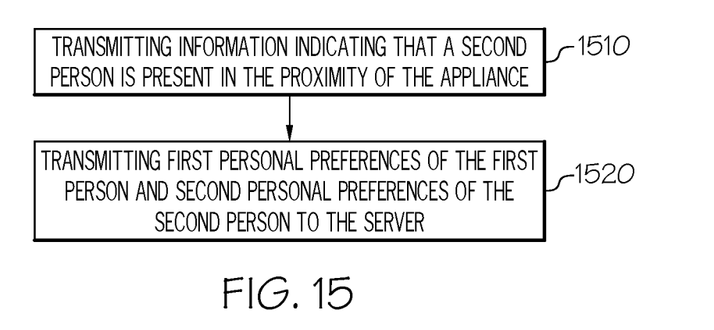

FIG. 15 is a flowchart of operations for operating an appliance on a power grid operated by a utility. In some embodiments, more than one person may be in the proximity of the appliance. As an example, a first person and a second person may be in proximity of the appliance. Referring to FIG. 15, information indicating that a second person is present in the proximity of the appliance may be transmitted to the server, at block 1510. First personal preferences of the first person and second personal preferences of the second person may be transmitted to the server, at block 1520. The operational state that is received by the appliance includes aggregated conditions based on the first personal preferences and the second personal preferences.

Figure 16:
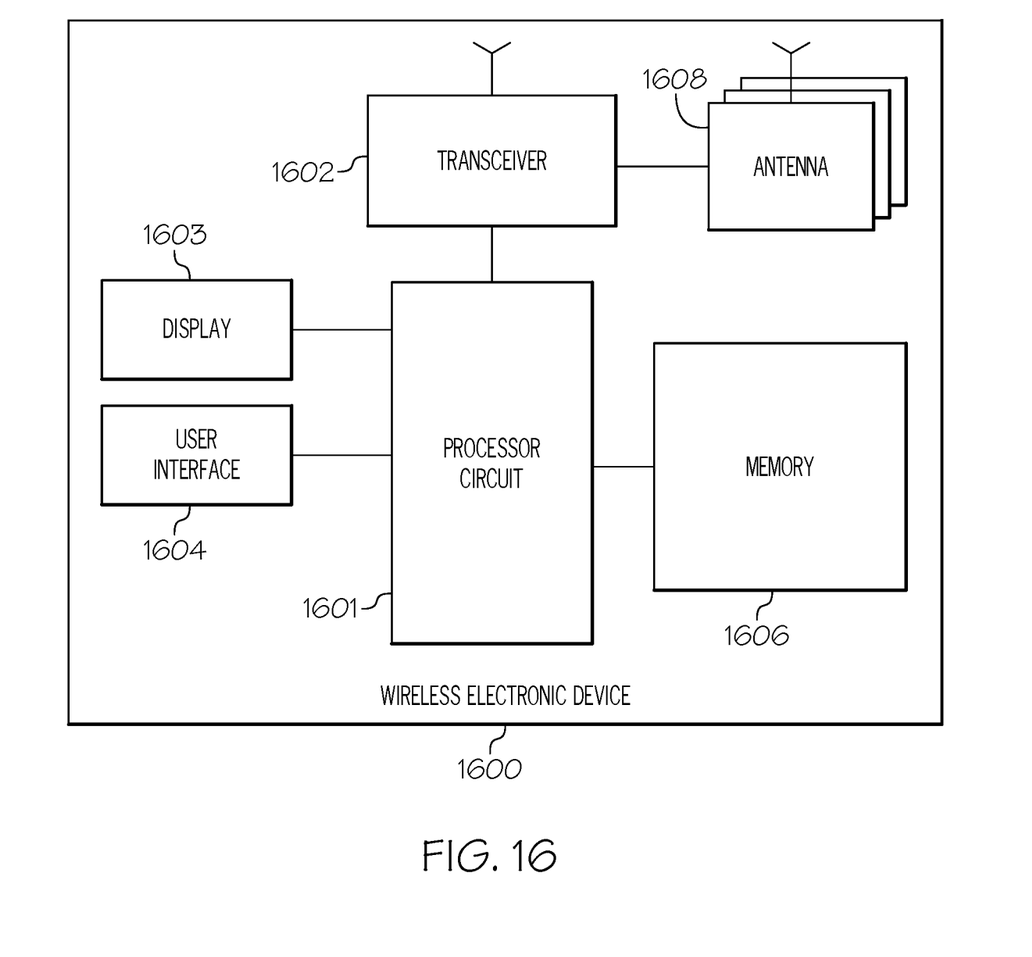
FIG. 16 is a block diagram of an appliance, according to various embodiments described herein.

FIG. 16 is a block diagram of an appliance 1600 on a power grid operated by a utility, such as appliance 110 of FIG. 1. The appliance 1600 of FIG. 16 may correspond to devices such as appliance 110, 111, and/or 112 of FIG. 1. The appliance 1600 may be integrated with a camera and/or sensors such as biometric sensors and is configured to perform operations according to one or more embodiments disclosed herein. Referring to FIG. 16, appliance 1600 includes a display 1603, a processor circuit 1601, and a memory 1606 containing computer readable program code. Display 1603 may include a display circuit, display driver, and/or a screen for display/viewing of information or images. The processor circuit 1601 may include one or more data processing circuits, such as a general purpose and/or special purpose processor, e.g., microprocessor and/or digital signal processor, which may be co-located or distributed across one or more networks. The processor circuit 1601 is configured to execute the computer readable program code in the memory 1606 to perform at least some of the operations and/or methods described herein as being performed by the appliance 1600. A user interface 1604 is coupled to the processor circuit 1601 and may communicate with a server or other external network entity as well as a wireless electronic device such as a mobile phone, directly or indirectly.

The appliance 1600 may be configured to perform operations described herein related to the wireless electronic device and/or appliances 110, 111, and/or 112 of FIG. 1. Some embodiments of the present inventive concepts may be directed to a computer program product that includes a non-transitory computer readable storage medium including computer readable program code therein that when executed by a processor causes the processor to perform operations described herein.

Still referring to FIG. 16, the appliance 1600 may include a transceiver 1602 configured to perform various operations such as transmitting information indicating presence of a person, receiving control information via a communication link, transmitting biometric information of a person, receiving a notification of energy demands, transmitting selections, and/or transmitting personal preferences. The transceiver 1602 may use one or more antennas 1608 to transmit and/or receive information from a server and/or wireless electronic device.

In some embodiments, an appliance on a power grid operated by a utility may include a transmitter configured to transmit to a server associated with the utility, information indicating whether a person is present in a proximity of the appliance. The appliance may include a receiver configured to receive, via a communication link associated with the power grid, control information including an operational state to control operation of the appliance, responsive to the person being in the proximity of the appliance. The appliance may include a processor configured to operate the appliance based on the operational state that was received.

A server that is remote from the appliance 1600 may include a one or more processors configured to perform operations including receiving information indicating whether a person is present in the proximity of the appliance, and/or determining and transmitting the operational state of the appliance 1600. The one of more processors of the server that is remote from the appliance 1600 may determine whether a person is a restricted person, set operational states, receive biometric information or health information associated with the person in the proximity of the appliance 1600, and/or aggregate personal preferences of persons in the proximity of appliance 1600.

Further Definitions

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art, and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and/or subcombinations of embodiments and of the manner and process of making and using them, and shall support claims to any such combination or subcombination. Many variations and modifications can be made to the embodiments without substantially departing from the principles described herein. All such variations and modifications are intended to be included herein within the scope.

The invention claimed is:

1. A method of operating an appliance on a power grid operated by a utility, the method comprising:
   receiving, at a server, information indicating whether a person is present in a proximity of the appliance;
   determining, by the server, an operational state of the appliance based on whether the person is present in the proximity of the appliance;
   transmitting to the appliance, via a communication link, control information related to the operational state to control operation of the appliance;
   identifying a first energy sub-grid that is in a first geographical area and is associated with the appliance; and
   determining a second energy sub-grid from which energy is transferred to the first energy sub-grid associated with the appliance based on biometric proximity sensors that determine that one or more persons are not in a second geographical area associated with the second energy sub-grid,
   wherein the biometric proximity sensors determine that the one or more persons are not in the second geographical area based on information from the biometric proximity sensors indicating that the one or more persons are beyond a threshold distance from the appliance.

2. The method of claim 1, further comprising:
   determining, by the server, whether the person is a restricted person, responsive to determining that the person is present in the proximity of the appliance; and
   setting the operational state of the appliance to a restricted state when the person is the restricted person.

3. The method of claim 2, further comprising:
   detecting that the restricted person has left the proximity of the appliance; and
   setting the operational state of the appliance to an unrestricted state, responsive to detecting that the restricted person has left the proximity,
   wherein, the control information comprises information indicating the unrestricted state.

4. The method of claim 2,
   wherein setting the operational state of the appliance comprises enabling the appliance, disabling the appliance, controlling characteristics of the appliance, and/or controlling power from the power grid to the appliance.

5. The method of claim 1, further comprising:
   receiving, by the server, biometric information associated with the person, responsive to determining that the person is present in the proximity of the appliance,
   wherein the operational state of the appliance is determined based on the biometric information.

6. The method of claim 5,
   wherein the biometric information comprises sleep information of the person.

7. The method of claim 6,
   wherein the operational state indicates activating the appliance based on the sleep information of the person indicating the person is awake, and
   wherein the operational state indicates deactivating the appliance based on the sleep information of the person indicating the person is asleep.

8. The method of claim 6,
   wherein the sleep information of the person comprises a sleep pattern, and
   wherein the operational state indicates an operational pattern for operation of the appliance based on the sleep pattern.

9. The method of claim 1, further comprising:
   receiving, by the server, health information associated with the person, responsive to determining that the person is present in the proximity of the appliance,
   wherein the operational state of the appliance is determined based on the health information.

10. The method of claim 1, further comprising:
    transmitting, to the appliance, a notification of energy demands, responsive to determining that the person is present in the proximity of the appliance; and
    receiving a selection responsive to the notification of energy demands,
    wherein the control information related to the operational state of the appliance is based on the selection that was received.

11. The method of claim 1, wherein the person comprises a first person, the method further comprising:
    receiving, by the server, information indicating whether a second person is present in the proximity of the appliance;
    receiving, by the server, first personal preferences of the first person and second personal preferences of the second person;
    aggregating the first personal preferences and the second personal preferences to determine aggregated conditions; and
    determining the control information related to the operational state of the appliance based on the aggregated conditions.

12. The method of claim 1,
    wherein the server is associated with the utility,
    wherein the communication link is associated with the power grid.

13. The method of claim 1,
    wherein the proximity comprises a distance within 10 meters of the appliance.

14. The method of claim 1, wherein the second energy sub-grid is selected based on an auction process comprising an amount of energy and/or a price of energy from the second energy sub-grid.

15. The method of claim 1, further comprising:
    determining, by the server, whether the person is a restricted person, responsive to determining that the person is present in the proximity of the appliance; and
    transferring the energy from the first energy sub-grid to the second energy sub-grid, responsive to determining that the person is the restricted person.

16. The method of claim 1,
    wherein the biometric proximity sensors are configured to collect biometric information of the one or more persons,
    wherein the biometric information comprises sleep information of the one or more persons.

17. The method of claim 16, further comprising:
    transferring the energy to the first energy sub-grid from the second energy sub-grid based on the biometric proximity sensors indicating that the one or more persons are in the second geographical area associated with the second energy sub-grid and based on the sleep information of the one or more persons indicating the one or more persons are asleep.

18. The method of claim 16, further comprising:
maintaining the energy in the second energy sub-grid and setting the operational state to activate the appliance based on the sleep information of the one or more persons indicating the one or more persons are awake, and
transferring the energy to the first energy sub-grid from the second energy sub-grid and setting the operational state to deactivate the appliance based on the sleep information of the one or more persons indicating the one or more persons are asleep.

19. A computer program product for operating an appliance on a power grid operated by a utility comprising:
a non-transitory computer readable storage medium comprising computer readable program code therein that when executed by a processor causes the processor to perform operations comprising:
transmitting, to a server, information indicating whether a person is present in a proximity of the appliance;
receiving, via a communication link, control information comprising an operational state to control operation of the appliance, responsive to the person being in the proximity of the appliance;
identifying a first energy sub-grid that is in a first geographical area and is associated with the appliance;
determining a second energy sub-grid from which energy is transferred to the first energy sub-grid associated with the appliance based on biometric proximity sensors that determine that one or more persons are not in a second geographical area associated with the second energy sub-grid; and
operating the appliance based on the operational state that was received using energy from the first energy sub-grid or the second energy sub-grid based on the biometric proximity sensors that determined that the one or more persons are not in the second geographical area,
wherein the biometric proximity sensors determine that the one or more persons are not in the second geographical area based on information from the biometric proximity sensors indicating that the one or more persons are beyond a threshold distance from the appliance.

20. The computer program product of claim 19,
wherein the server determines whether the person is a restricted person, responsive to determining that the person is present in the proximity of the appliance, and
wherein the first energy sub-grid is configured to transferring the energy from the first energy sub-grid to the second energy sub-grid, responsive to the person being the restricted person.

21. The computer program product of claim 19,
wherein the biometric proximity sensors are configured to collect biometric information of the one or more persons,
wherein the biometric information comprises sleep information of the one or more persons.

22. The computer program product of claim 21,
wherein the energy is transferred to the first energy sub-grid from the second energy sub-grid based on the biometric proximity sensors indicating that the one or more persons are in the second geographical area associated with the second energy sub-grid and based on the sleep information of the one or more persons indicating the one or more persons are asleep.

23. The computer program product of claim 21,
wherein the energy is maintained in the second energy sub-grid and setting the operational state to activate the appliance based on the sleep information of the one or more persons indicating the one or more persons are awake, and
wherein the energy is transferred to the first energy sub-grid from the second energy sub-grid and the operational state is set to deactivate the appliance based on the sleep information of the one or more persons indicating the one or more persons are asleep.

24. An appliance on a power grid operated by a utility comprising:
a transmitter configured to transmit to a server, information indicating whether a person is present in a proximity of the appliance;
a receiver configure to receive, via a communication link, control information comprising an operational state to control operation of the appliance, responsive to the person being in the proximity of the appliance; and
a processor configured to operate the appliance based on the operational state that was received,
wherein a first energy sub-grid is in a first geographical area and is associated with the appliance,
wherein a second energy sub-grid is configured to transfer energy to the first energy sub-grid associated with the appliance based on biometric proximity sensors that determine that one or more persons are not in a second geographical area associated with the second energy sub-grid, and
wherein the biometric proximity sensors determine that the one or more persons are not in the second geographical area based on information from the biometric proximity sensors indicating that the one or more persons are beyond a threshold distance from the appliance.

25. The appliance of claim 24,
wherein the server is configured to determine whether the person is a restricted person, responsive to determining that the person is present in the proximity of the appliance, and
wherein the energy is transferred from the first energy sub-grid to the second energy sub-grid, responsive to determining that the person is the restricted person.

26. The appliance of claim 24,
wherein the biometric proximity sensors are configured to collect biometric information of the one or more persons,
wherein the biometric information comprises sleep information of the one or more persons.

27. The appliance of claim 26,
wherein the energy is transferred to the first energy sub-grid from the second energy sub-grid based on the biometric proximity sensors indicating that the one or more persons are in the second geographical area associated with the second energy sub-grid and based on the sleep information of the one or more persons indicating the one or more persons are asleep.

28. The appliance of claim 26,
wherein the energy is maintained in the second energy sub-grid and setting the operational state to activate the appliance based on the sleep information of the one or more persons indicating the one or more persons are awake, and wherein the energy is transferred to the first energy sub-grid from the second energy sub-grid and the operational state is set to deactivate the appliance based on the sleep information of the one or more persons indicating the one or more persons are asleep.

\* \* \* \* \*